US012341308B2

(12) United States Patent
Li et al.

(10) Patent No.: US 12,341,308 B2
(45) Date of Patent: Jun. 24, 2025

(54) CONNECTION TERMINAL AND CONNECTOR

(71) Applicant: Tyco Electronics (Shanghai) Co., Ltd., Shanghai (CN)

(72) Inventors: Jianxiong Li, Shanghai (CN); Haomai Yin, Shanghai (CN); Shiyang Tan, Suzhou (CN)

(73) Assignee: Tyco Electronics (Shanghai) Co., Ltd., Shanghai (CN)

( * ) Notice: Subject to any disclaimer, the term of this patent is extended or adjusted under 35 U.S.C. 154(b) by 401 days.

(21) Appl. No.: 17/849,817

(22) Filed: Jun. 27, 2022

(65) Prior Publication Data

US 2023/0006370 A1 Jan. 5, 2023

(30) Foreign Application Priority Data

Jun. 30, 2021 (CN) ........................ 202121468357.4

(51) Int. Cl.

*H01R 4/30* (2006.01)
*H01R 13/502* (2006.01)
*H01R 25/16* (2006.01)

(52) U.S. Cl.

CPC ............ *H01R 4/30* (2013.01); *H01R 13/502* (2013.01); *H01R 25/16* (2013.01)

(58) Field of Classification Search

CPC ......... H01R 4/30; H01R 13/502; H01R 25/16
USPC ....... 439/801, 217, 218, 224, 907, 954, 812, 439/814
See application file for complete search history.

(56) References Cited

U.S. PATENT DOCUMENTS 3,407,382 A * 10/1968 Haegert ............... H01R 11/281 411/389
4,946,405 A * 8/1990 Boehm .................... H01R 4/36 439/810
5,093,215 A * 3/1992 Hasegawa ................ H01R 4/36 439/813
5,920,456 A * 7/1999 Bozzone .................. H02B 1/16 174/59
7,445,487 B1 * 11/2008 Guethoff .............. H01R 9/2491 439/374
7,591,660 B1 * 9/2009 Eichhorst ................ H01R 9/24 439/721
8,425,264 B2 * 4/2013 Michell .................... H01R 4/42 439/907
2001/0051450 A1 * 12/2001 Ross .................... H05K 1/0263 439/78

(Continued)

*Primary Examiner* — Gary F Paumen
(74) *Attorney, Agent, or Firm* — Potomac Law Group, PLLC

(57) ABSTRACT

A connection terminal and a connector are disclosed. The connection terminal has a terminal body, at least part of which is installed in a housing of a connector; and a first connection part arranged at one end of the terminal body and extending outside the housing to electrically connect with a bus bar. The first connection part has a plurality of side surfaces, and any one of the adjacent two side surfaces is selectively formed to match and connect with a surface of a connection end of the bus bar. In the present invention, the installation orientation of the connector can be any one of four or more different directions, which expands the application range of the connector.

18 Claims, 12 Drawing Sheets

(56) References Cited

U.S. PATENT DOCUMENTS

2013/0316572 A1 * 11/2013 Ishikawa ............. H01R 13/641
439/569
2019/0305471 A1 * 10/2019 Kawamura ........ H01R 13/5202

* cited by examiner

CONNECTION TERMINAL AND CONNECTOR

CROSS-REFERENCE TO RELATED APPLICATION

This application claims the benefit of Chinese Patent Application No. 202121468357.4 filed on Jun. 30, 2021 in the State Intellectual Property Office of China, the whole disclosure of which is incorporated herein by reference.

BACKGROUND OF THE INVENTION

Field of the Invention

The present invention relates to a connection terminal and a connector including the connection terminal.

Description of the Related Art

A connector for connecting a bus bar usually includes a housing and a connection terminal installed in the housing. The connection terminal has a first connection end and a second connection end. The first connection end is connected with the bus bar, and the second connection end is matched with a mating connector. In the prior art, the first connection end of the connection terminal is usually flat, and the connection end of the bus bar can only be connected to the front and rear side surfaces of the first connection end of the connection terminal, which leads to the installation orientation of the connector can only be 0 degrees or 180 degrees, but not 90 degrees or 270 degrees, which limits the application of the connector.

SUMMARY OF THE INVENTION

The present invention has been made to overcome or alleviate at least one aspect of the above mentioned disadvantages.

According to an aspect of the present invention, there is provided a connection terminal comprises of: a terminal body, at least part of which is installed in a housing of a connector; and a first connection part arranged at one end of the terminal body and extending outside the housing to electrically connect with a bus bar. The first connection part has a plurality of side surfaces, and any one of the adjacent two side surfaces is selectively formed to match and connect with a surface of a connection end of the bus bar.

According to an exemplary embodiment of the present invention, the first connection part also has a bottom surface, which is shaped to match the surface of the connection end of the bus bar, so that the bus bar is adapted to be connected to the bottom surface.

According to another exemplary embodiment of the present invention, the width and/or length of any one of the plurality of side surfaces and the bottom surface of the first connection part is not less than the width of the connection end of the bus bar.

According to another exemplary embodiment of the present invention, the plurality of side surfaces of the first connection part have the same size and shape, and the bottom surface is a regular polygon.

According to another exemplary embodiment of the present invention, the first connection part is a cube, so that the plurality of side surfaces and the bottom surface are squares with the same size.

According to another exemplary embodiment of the present invention, a mounting hole is formed on at least one of the plurality of side surfaces and the bottom surface of the first connection part.

According to another exemplary embodiment of the present invention, the connection terminal further comprises of: a screw sleeve embedded in the mounting hole; and a screw adapted to be screwed into the screw sleeve, so as to connect the bus bar to the connection terminal.

According to another exemplary embodiment of the present invention, the mounting hole is a blind hole that does not penetrate through the first connection part, and the screw sleeve is embedded in the mounting hole in the form of interference fit.

According to another exemplary embodiment of the present invention, a threaded hole is formed on at least one of the plurality of side surfaces and the bottom surface of the first connection part.

According to another exemplary embodiment of the present invention, the threaded hole is a through hole penetrating through the first connection part or a blind hole not penetrating through the first connection part.

According to another exemplary embodiment of the present invention, the plurality of side surfaces comprise of: a first side surface; a second side surface parallel and opposite to the first side surface; a third side surface perpendicular to the first side surface and the second side surface; and a fourth side surface parallel and opposite to the third side surface.

According to another exemplary embodiment of the present invention, when the bus bar is connected to the first side surface, an installation orientation of the connector is 0 degrees; when the bus bar is connected to the second side surface, an installation orientation of the connector is 180 degrees; when the bus bar is connected to the third side surface, an installation orientation of the connector is 90 degrees; when the bus bar is connected to the fourth side surface, an installation orientation of the connector is 270 degrees.

According to another exemplary embodiment of the present invention, the housing has an insertion port for mating with a mating connector, and an axis of the insertion port is perpendicular to the first side surface and the second side surface and parallel to the third side surface and the fourth side surface.

According to another exemplary embodiment of the present invention, the bottom surface of the first connection part is perpendicular to the plurality of side surfaces and parallel to the axis of the insertion port of the housing; when the bus bar is connected to the bottom surface, the installation orientation of the connector is capable of being selected from any one of 0 degrees, 90 degrees, 180 degrees and 270 degrees.

According to another exemplary embodiment of the present invention, the connection terminal further comprises a second connection part connected to the other end of the terminal body and adapted to mate with a terminal of a mating connector; an axis of the second connection part coincides with the axis of the insertion port of the housing.

According to another exemplary embodiment of the present invention, one of the first connection part and the second connection part is integrally formed with the terminal body, and the other is separate from the terminal body; or the first connection part, the second connection part and the terminal body are integrally formed.

According to another aspect of the present invention, there is provided a connector comprises a housing and the above connection terminal, at least a part of the terminal body of the connection terminal is installed in the housing, the first connection part of the connection terminal extends out of the housing for electrical connection with a bus bar.

According to an exemplary embodiment of the present invention, the housing comprises a mounting flange, which has an installation centerline and has a plurality of installation orientations relative to the installation centerline; the first connection part has a central axis which coincides with the installation centerline.

In the foregoing exemplary embodiments according to the present invention, the installation orientation of the connector can be selected to be any one of four or more different directions, which expands the application range of the connector.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS

Figure 1:
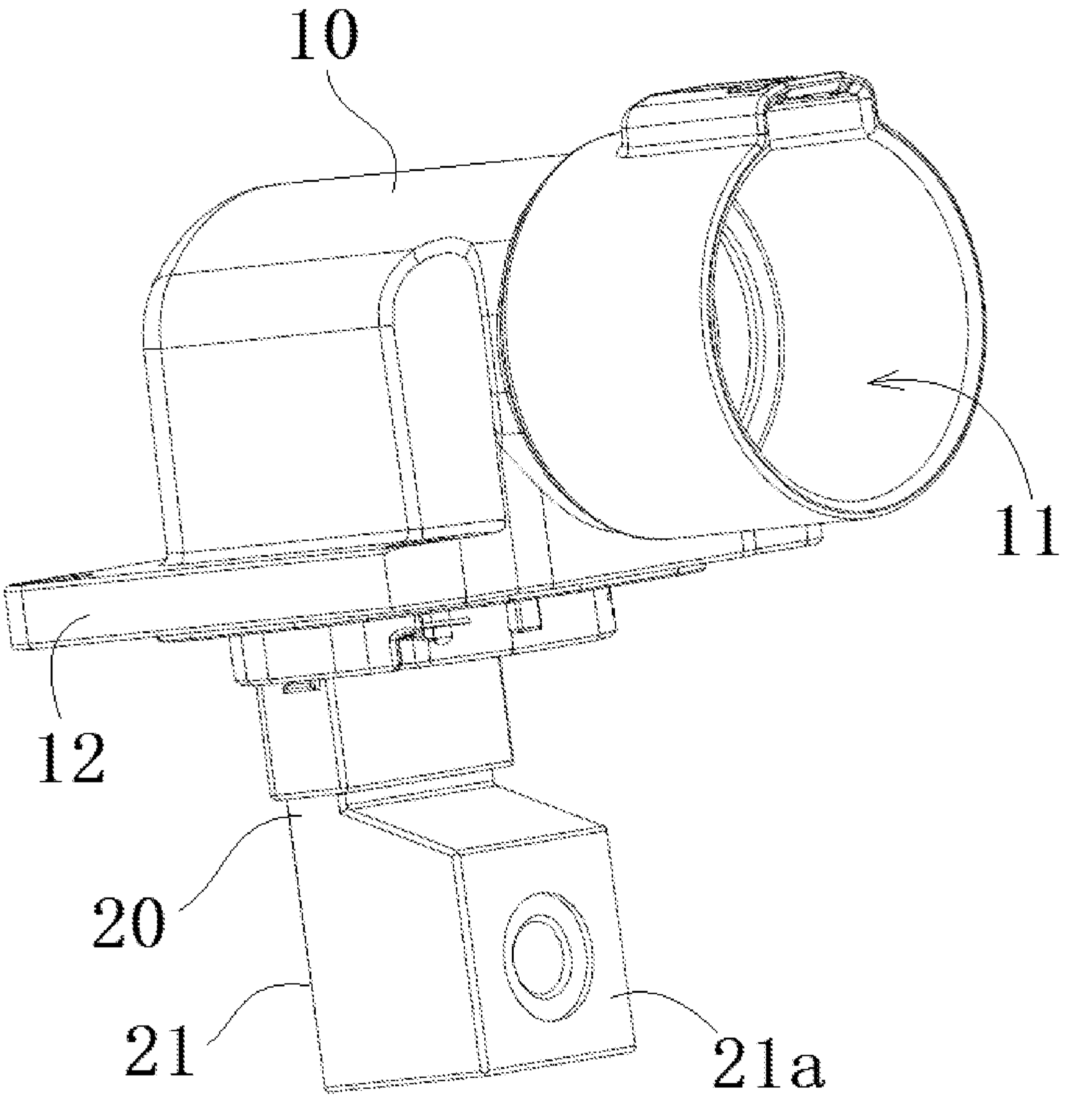
FIG. 1 shows an illustrative perspective view of a connector according to an exemplary embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to a general concept of the present invention, there is provided a connection terminal comprises of: a terminal body, at least part of which is installed in a housing of a connector; and a first connection part arranged at one end of the terminal body and extending outside the housing to electrically connect with a bus bar. The first connection part has a plurality of side surfaces, and any one of the adjacent two side surfaces is selectively formed to match and connect with a surface of a connection end of the bus bar.

Figure 2:
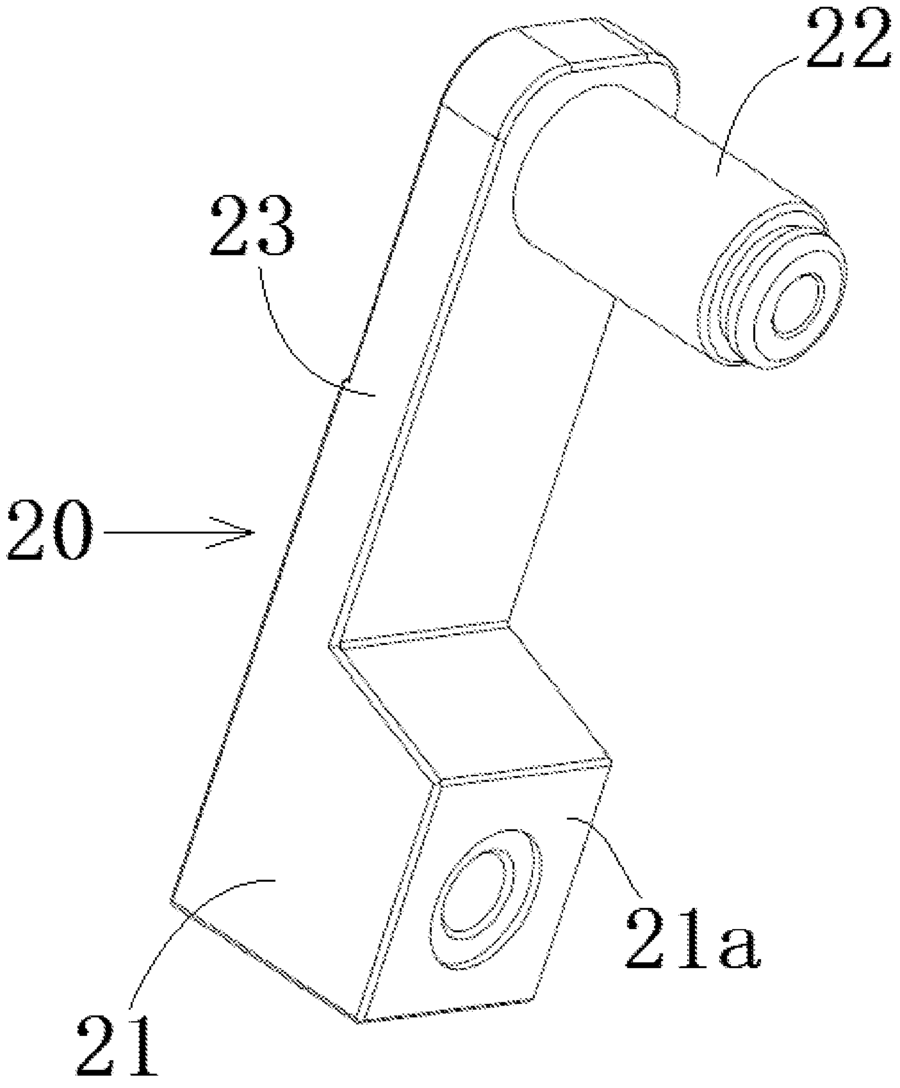
FIG. 2 shows an illustrative perspective view of the connection terminal of the connector shown in FIG. 1.
Figure 3:
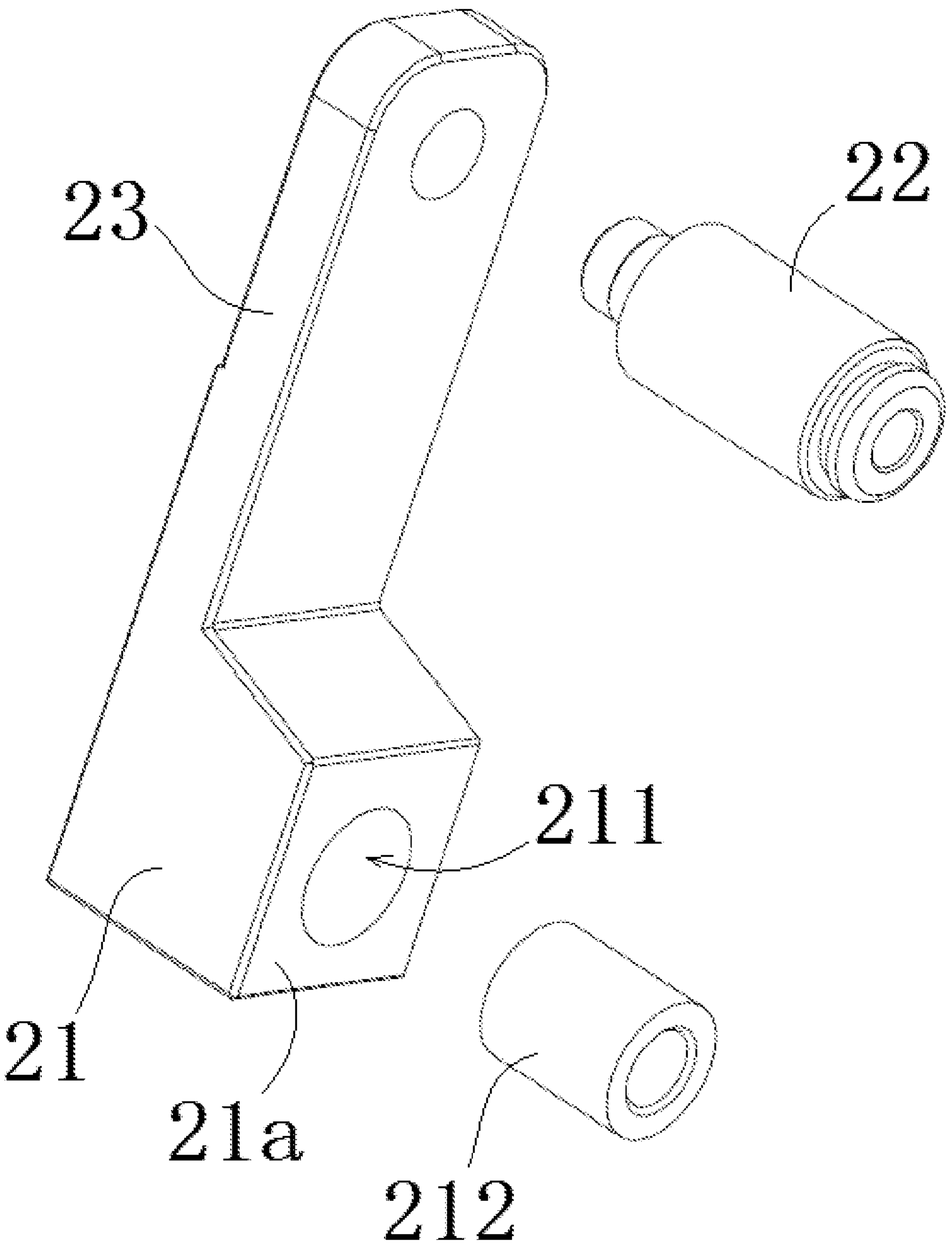
FIG. 3 shows an exploded schematic diagram of the connection terminal of the connector shown in FIG. 2.

FIG. 1 shows an illustrative perspective view of a connector according to an exemplary embodiment of the present invention. FIG. 2 shows an illustrative perspective view of the connection terminal 20 of the connector shown in FIG. 1. FIG. 3 shows an exploded schematic diagram of the connection terminal 20 of the connector shown in FIG. 2.

As shown in FIGS. 1 to 4, in the illustrated embodiment, the connector mainly includes a housing 10 and a connection terminal 20. The connection terminal 20 includes a terminal body 23 and a first connection part 21 connected to one end of the terminal body 23. At least a part of the terminal body 23 is installed in the housing 10. The first connection part 21 is exposed to the outside of the housing 10 for electrical connection with the bus bar 30.

As shown in FIGS. 1 to 12, in an exemplary embodiment of the present invention, the first connection part 21 has a plurality of side surfaces 21*a*, 21*b*, 21*c* and 21*d*. Any one of the adjacent two side surfaces of the plurality of side surfaces 21*a*, 21*b*, 21*c* and 21*d* can be selectively shaped to match the surface of the connection end of the bus bar 30, so that the bus bar 30 is suitable to be connected to any one of the adjacent two side surfaces of the plurality of side surfaces 21*a*, 21*b*, 21*c* and 21*d*.

As shown in FIGS. 1 to 12, in an exemplary embodiment of the present invention, the first connection part 21 may also have a bottom surface 21*e*, which is shaped to match the surface of the connection end of the bus bar 30, so that the bus bar 30 is suitable to be connected to the bottom surface 21*e*.

As shown in FIGS. 1 to 12, in the illustrated embodiment, the first connection part 21 has a plurality of side surfaces 21*a*, 21*b*, 21*c*, 21*d* and a bottom surface 21*e* at the same time. Any one of the plurality of side surfaces 21*a*, 21*b*, 21*c*, 21*d* and the bottom surface 21*e* is shaped to match the surface of the connection end of the bus bar 30 so that the bus bar 30 is suitable to be connected to any one of the plurality of side surfaces 21*a*, 21*b*, 21*c*, 21*d* and the bottom surface 21*e*.

Figure 4:
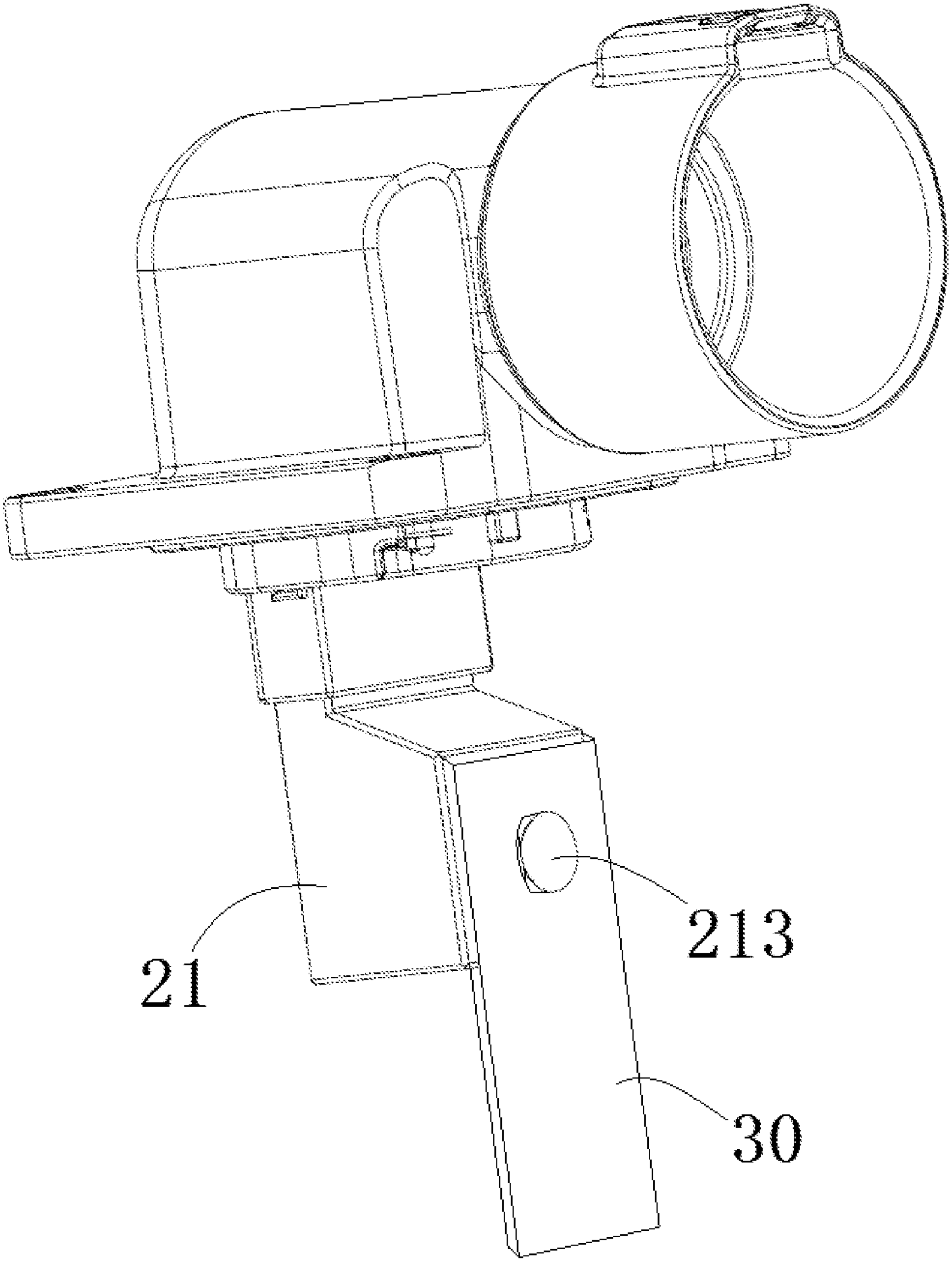
FIG. 4 is an illustrative view of connecting the connection terminal of the connector shown in FIG. 1 to the bus bar.

FIG. 4 shows a schematic diagram of the connection terminal 20 of the connector shown in FIG. 1 connected to the bus bar 30. In the embodiments shown in FIGS. 1 to 4, the bus bar 30 is connected to the first side surface 21*a* of the first connection part 21 of the connection terminal 20. In this case, the installation orientation of the connector is 0 degrees.

Figure 5:
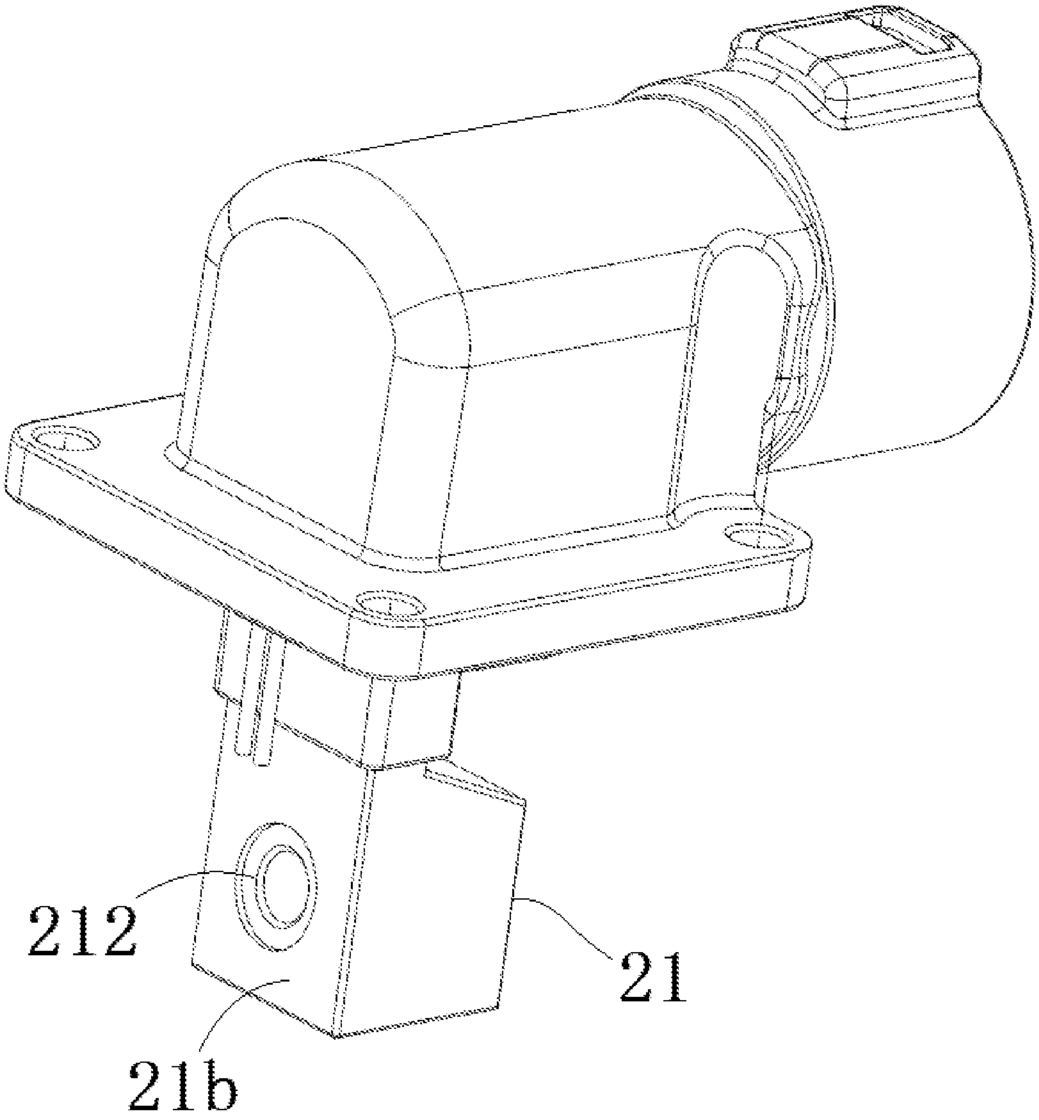
FIG. 5 shows an illustrative perspective view of a connector according to another exemplary embodiment of the present invention.
Figure 6:
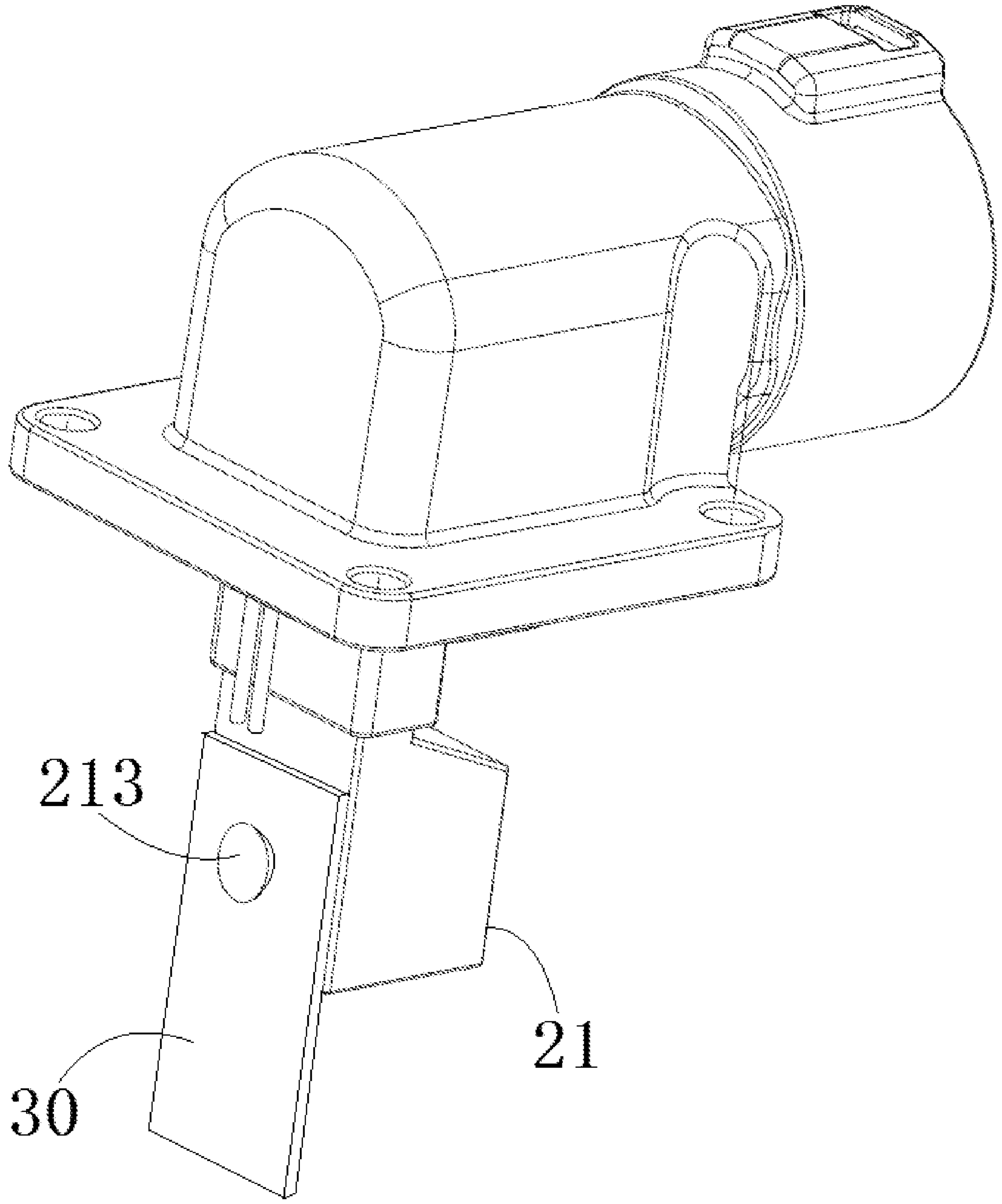
FIG. 6 is an illustrative view of connecting the connection terminal of the connector shown in FIG. 5 to the bus bar.

FIG. 5 shows an illustrative perspective view of a connector according to another exemplary embodiment of the present invention. FIG. 6 shows a schematic diagram of the connection terminal 20 of the connector shown in FIG. 5 connected to the bus bar 30.

As shown in FIGS. 5 and 6, in the illustrated embodiment, the bus bar 30 is connected to the second side surface 21*b* of the first connection part 21 of the connection terminal 20. In this case, the installation orientation of the connector is 180 degrees.

Figure 7:
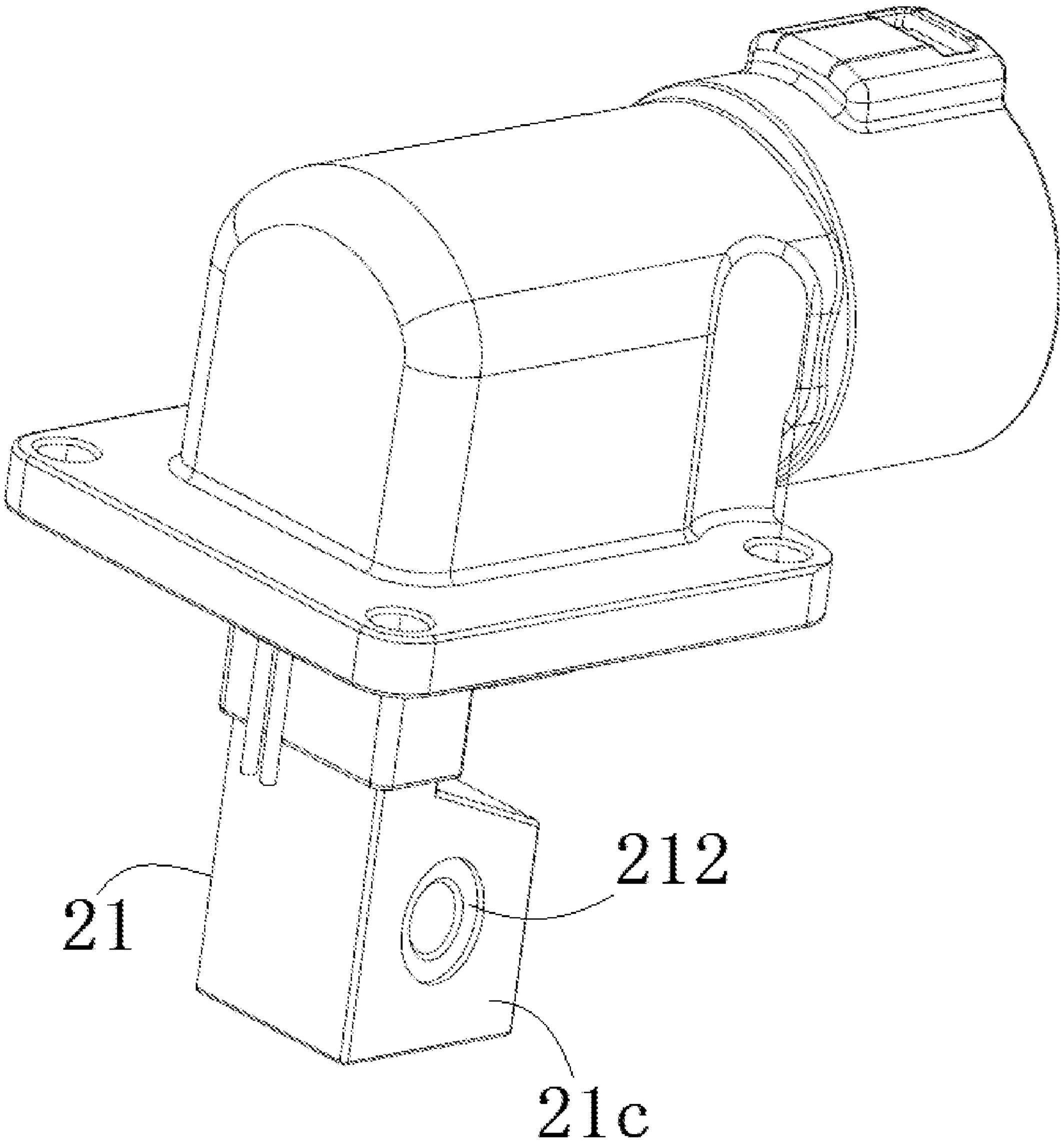
FIG. 7 shows an illustrative perspective view of a connector according to another exemplary embodiment of the present invention.
Figure 8:
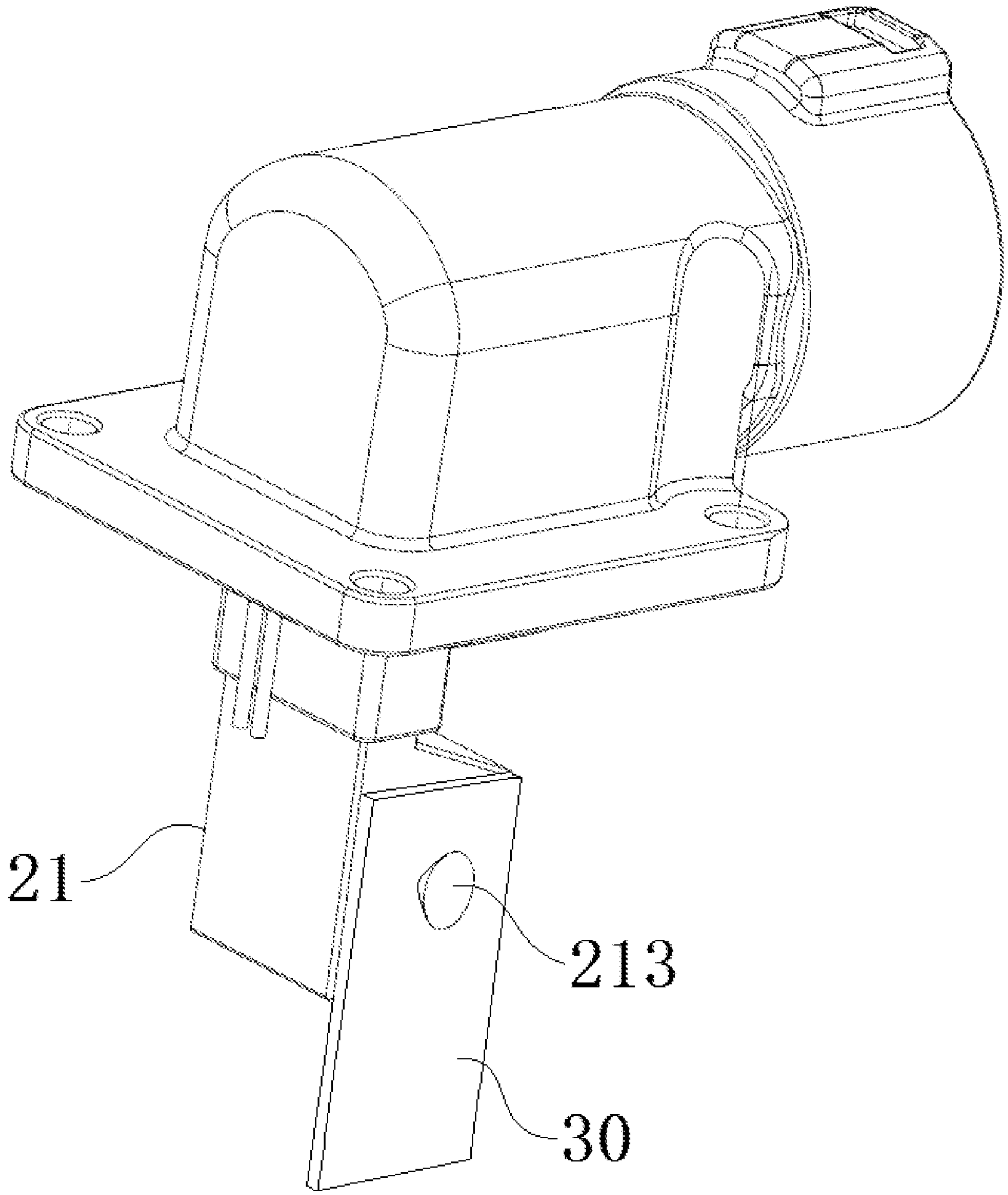
FIG. 8 is an illustrative view of connecting the connection terminal of the connector shown in FIG. 7 to the bus bar.

FIG. 7 shows an illustrative perspective view of a connector according to another exemplary embodiment of the present invention. FIG. 8 shows a schematic diagram of the connection terminal 20 of the connector shown in FIG. 7 connected to the bus bar 30.

As shown in FIGS. 7 and 8, in the illustrated embodiment, the bus bar 30 is connected to the third side surface 21*c* of the first connection part 21 of the connection terminal 20. In this case, the installation orientation of the connector is 90 degrees.

Figure 9:
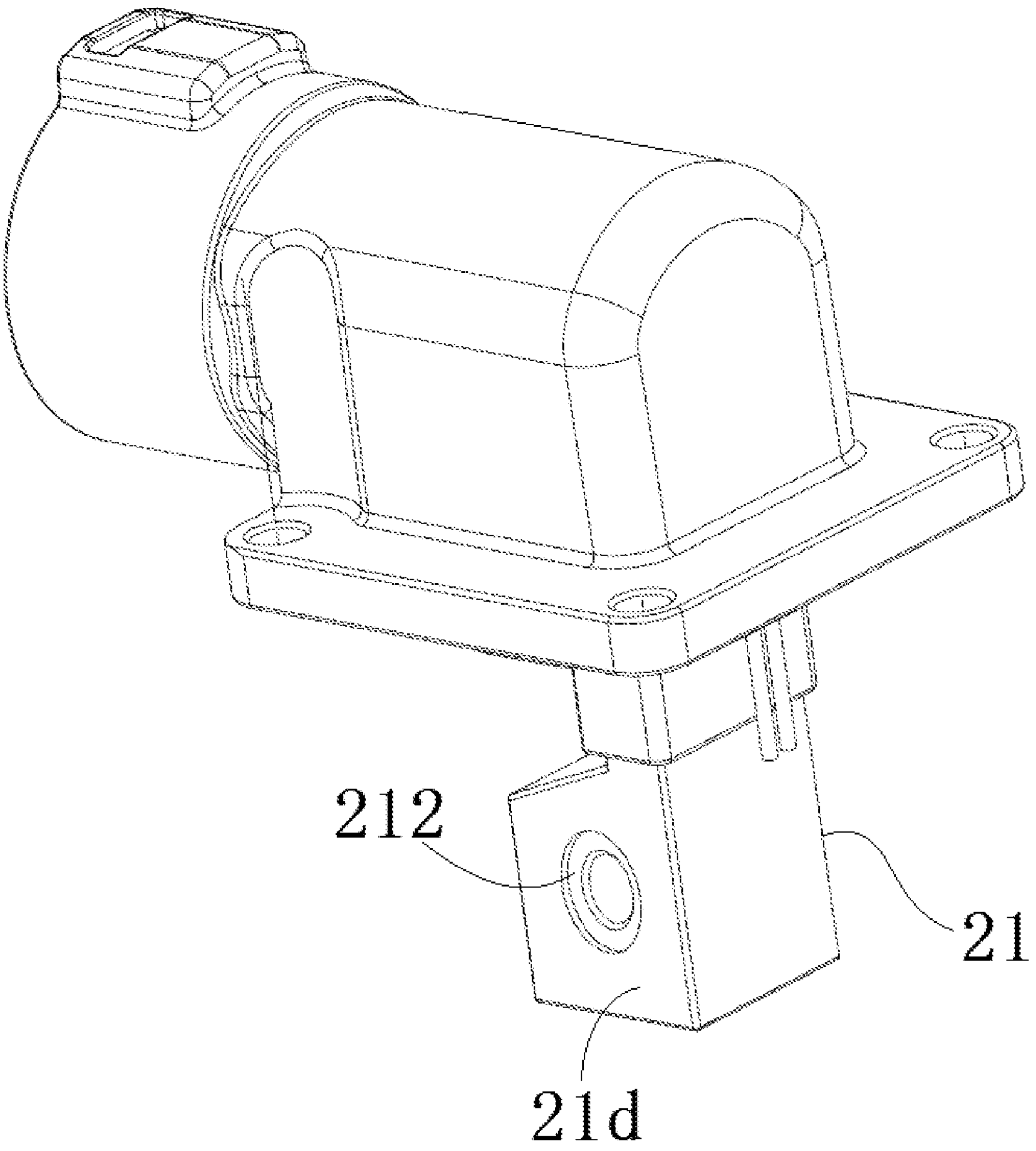
FIG. 9 shows an illustrative perspective view of a connector according to another exemplary embodiment of the present invention.
Figure 10:
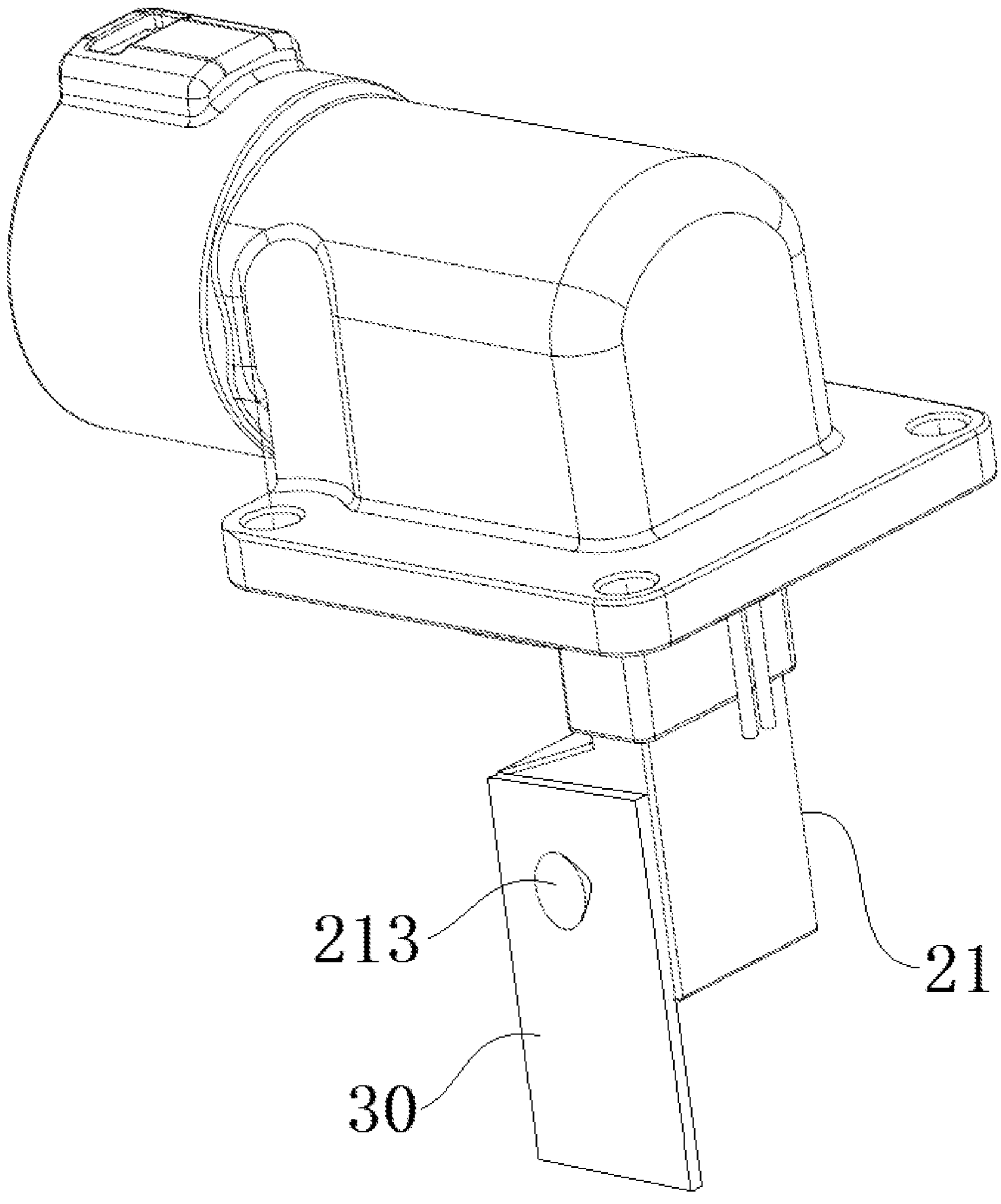
FIG. 10 is an illustrative view of connecting the connection terminal of the connector shown in FIG. 9 to the bus bar.

FIG. 9 shows an illustrative perspective view of a connector according to another exemplary embodiment of the present invention. FIG. 10 shows a schematic diagram of the connection terminal 20 of the connector shown in FIG. 9 connected to the bus bar 30.

As shown in FIGS. 9 and 10, in the illustrated embodiment, the bus bar 30 is connected to the fourth side surface 21*d* of the first connection part 21 of the connection terminal 20. In this case, the installation orientation of the connector is 270 degrees.

Figure 11:
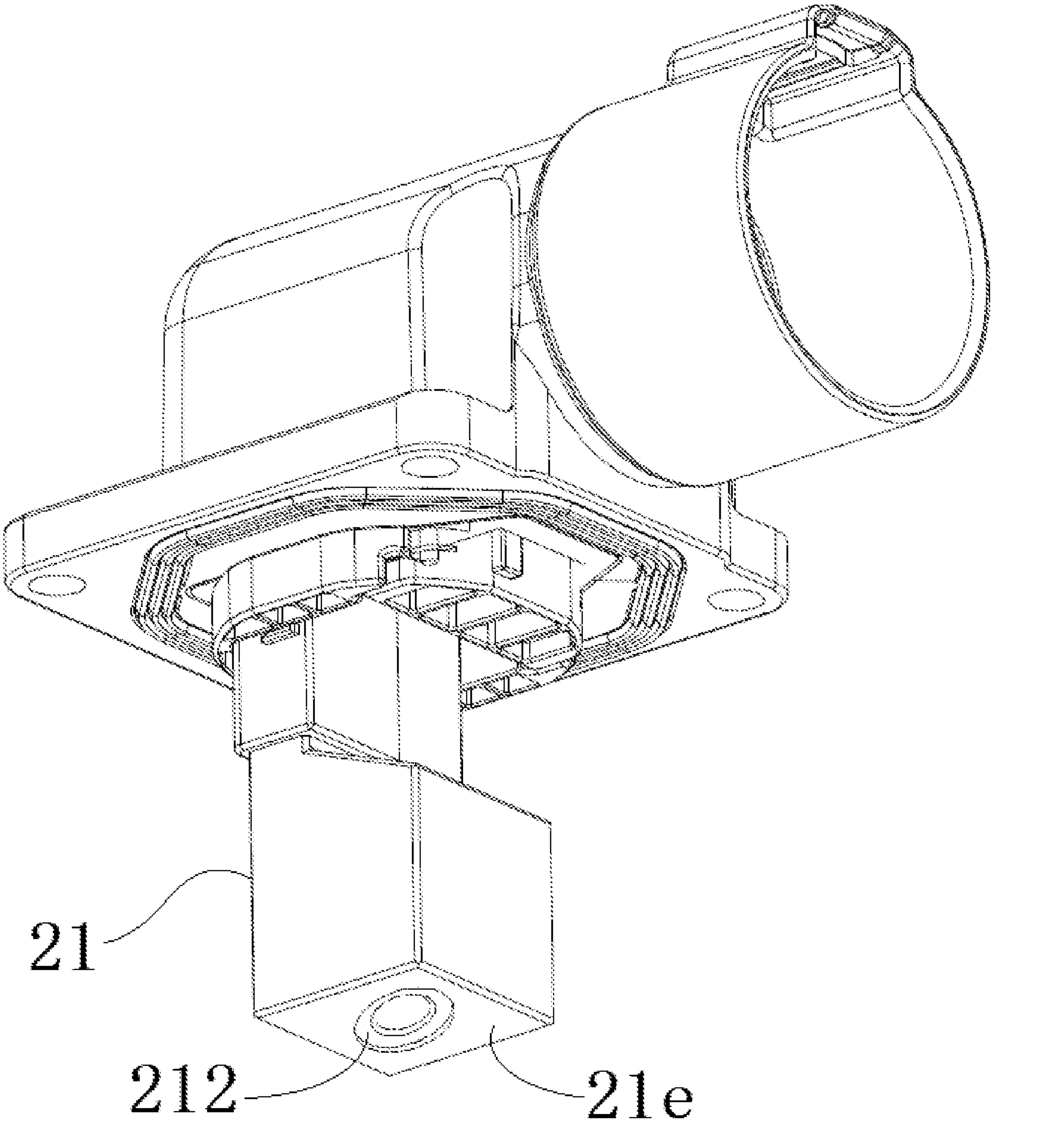
FIG. 11 shows an illustrative perspective view of a connector according to another exemplary embodiment of the present invention.
Figure 12:
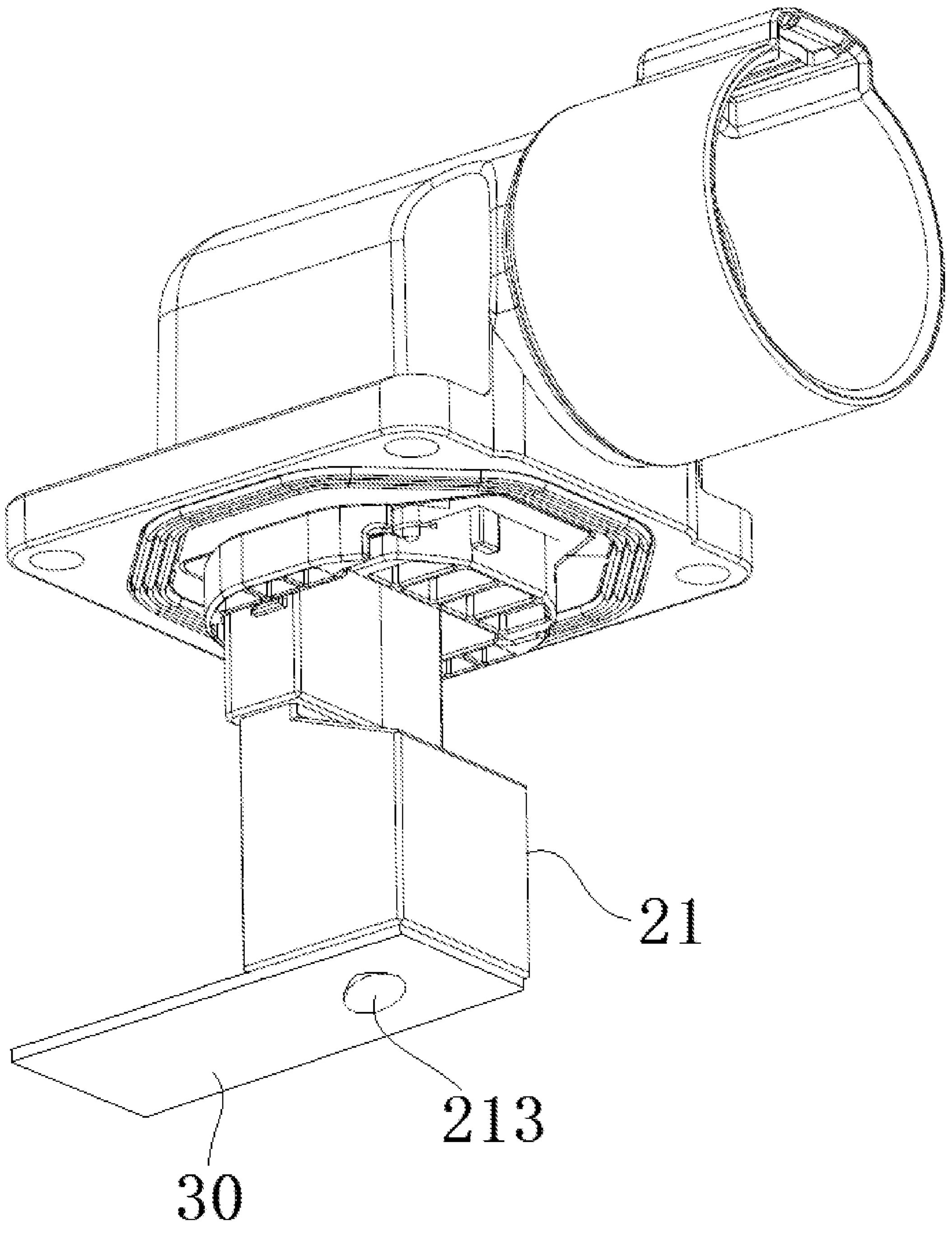
FIG. 12 is an illustrative view of connecting the connection terminal of the connector shown in FIG. 10 to the bus bar.

FIG. 11 shows an illustrative perspective view of a connector according to another exemplary embodiment of the present invention. FIG. 12 shows a schematic diagram of the connection terminal 20 of the connector shown in FIG. 11 connected to the bus bar 30.

As shown in FIGS. 11 and 12, in the illustrated embodiment, the bus bar 30 is connected to the bottom surface 21*e* of the first connection part 21 of the connection terminal 20. In this case, the installation orientation of the connector can be any one of 0 degrees, 90 degrees, 180 degrees and 270 degrees. Because the bottom surface 21*e* of the first connection part 21 can match the surface of the connection end of the bus bar 30 in any of the above four different directions.

As shown in FIGS. 1 to 12, in the illustrated embodiment, the width and/or length of any one of the plurality of side surfaces 21*a*, 21*b*, 21*c*, 21*d* and the bottom surface 21*e* of the first connection part 21 is not less than the width of the connection end of the bus bar 30. In this way, it can be ensured that the above-mentioned surfaces of the first connection part 21 can match the connection end of the bus bar 30 in size and shape.

As shown in FIGS. 1 to 12, in the illustrated embodiment, the first connection part 21 is a square so that the plurality of side surfaces 21*a*, 21*b*, 21*c*, 21*d* and the bottom surface 21*e* are squares of the same size, and the side length of the square is not less than the width of the connection end of the bus bar 30.

However, please note that the present invention is not limited to the illustrated embodiment. In another exemplary embodiment of the present invention, the plurality of side surfaces 21*a*, 21*b*, 21*c* and 21*d* of the first connection part 21 are rectangles of the same size, and the bottom 21*e* is a regular polygon. For example, the first connection part 21 may include three, four, five or more side surfaces, and the bottom surface 21*e* of the first connection part 21 may be an equilateral triangle, quadrilateral, pentagon or other regular polygon.

As shown in FIGS. 1 to 12, in the illustrated embodiment, a mounting hole 211 is formed on at least one of the plurality of side surfaces 21*a*, 21*b*, 21*c*, 21*d* and the bottom surface 21*e* of the first connection part 21. The connection terminal 20 includes a screw sleeve 212 and a screw 213. The screw sleeve 212 is embedded in the mounting hole 211. The screw 213 is adapted to mate with the screw sleeve 212 for connecting the bus bar 30 to the connection terminal 20.

As shown in FIGS. 1 to 12, in the illustrated embodiment, the mounting hole 211 is a blind hole that does not penetrate through the first connection part 21, and the screw sleeve 212 is embedded in the mounting hole 211 in an interference fit.

However, please note that the present invention is not limited to the illustrated embodiment. For example, in another exemplary embodiment of the present invention, a threaded hole is formed on at least one of the plurality of side surfaces 21*a*, 21*b*, 21*c*, 21*d* and the bottom surface 21*e* of the first connection part 21. The connection terminal 20 also includes a screw suitable for mating with the threaded hole for connecting the bus bar 30 to the connection terminal 20. The threaded hole is a through hole penetrating through the first connection part 21 or a blind hole not penetrating through the first connection part 21.

As shown in FIGS. 1 to 12, in the illustrated embodiment, the second side surface 21*b* is parallel and opposite to the first side surface 21*a*. The fourth side surface 21*d* is parallel and opposite to the third side surface 21*c*. The third side surface 21*c* and the fourth side surface 21*d* are perpendicular to the first side surface 21*a* and the second side surface 21*b*.

As shown in FIGS. 1 to 12, in the illustrated embodiment, the housing 10 has an insertion port 11 suitable for mating with the mating connector. The axis of the insertion port 11 is perpendicular to the first side surface 21*a* and the second side surface 21*b* and parallel to the third side surface 21*c* and the fourth side surface 21*d*.

As shown in FIGS. 1 to 12, in the illustrated embodiment, the bottom surface 21*e* of the first connection part 21 is perpendicular to the plurality of side surfaces 21*a*, 21*b*, 21*c* and 21*d* and parallel to the axis of the insertion port 11 of the housing 10. At this time, when the bus bar 30 is connected to the bottom 21*e*, the installation orientation of the connector can be any one of 0 degrees, 90 degrees, 180 degrees and 270 degrees.

As shown in FIGS. 1 to 4, in the illustrated embodiment, the connection terminal 20 also includes a second connection part 22. The second connection part 22 is connected to the other end of the terminal body 23 and is suitable for mating with a terminal of the mating connector (not shown). The axis of the second connection part 22 coincides with the axis of the insertion port 11 of the housing 10. The mating connector is inserted through the insertion port 11 of the housing 10 of the connector to mate with the connector.

As shown in FIGS. 1 to 4, in the illustrated embodiment, one of the first connection part 21 and the second connection part 22 is formed integrally with the terminal body 23, and the other is separate from the terminal body 23. In the illustrated embodiment, the first connection part 21 and the terminal body 23 are integrally formed, and the second connection part 22 and the terminal body 23 are separately formed. However, the present invention is not limited to the illustrated embodiment. For example, in another exemplary embodiment of the present invention, the first connection part 21, the second connection part 22 and the terminal body 23 are integrally formed.

As shown in FIGS. 1 to 4, in the illustrated embodiment, the housing 10 includes a mounting flange 12 having an installation centerline and a plurality of mounting orientations relative to the installation centerline. The first connection part 21 of the connection terminal 20 has a central axis, and the central axis of the first connection part 21 coincides with the installation centerline of the installation flange 12. Therefore, in the illustrated embodiment, the mounting flange 12 can be installed on the housing of an electrical equipment (not shown) at the installation orientation of 0 degrees, 90 degrees, 180 degrees or 270 degrees relative to its installation centerline.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A connection terminal, comprising:

a terminal body, at least part of which is installed in a housing of a connector;

a first connection part arranged at one end of the terminal body and extending outside the housing to electrically connect with a bus bar, the first connection part having a central axis;

a second connection part connected to the other end of the terminal body and adapted to mate with a terminal of a mating connector;

the first connection part has a plurality of side surfaces and a bottom surface, and any one of the side surfaces or bottom surface is selectively formed to match and connect with a surface of a connection end of the bus bar;

wherein any one of the plurality of sides surfaces and/or the bottom surface is adapted to be connected to the bus bar.

2. The connection terminal according to claim 1, wherein the width and/or length of any one of the plurality of side surfaces and the bottom surface of the first connection part is not less than the width of the connection end of the bus bar.

3. The connection terminal according to claim 1, wherein the plurality of side surfaces of the first connection part have the same size and shape, and the bottom surface is a regular polygon.

4. The connection terminal according to claim 1, wherein the first connection part is a cube, so that the plurality of side surfaces and the bottom surface are squares with the same size.

5. The connection terminal according to claim 1, wherein a mounting hole is formed on at least one of the plurality of side surfaces and the bottom surface of the first connection part.

6. The connection terminal according to claim 5, further comprising:

a screw sleeve embedded in the mounting hole; and a screw adapted to be screwed into the screw sleeve, so as to connect the bus bar to the connection terminal.

7. The connection terminal according to claim 6, wherein the mounting hole is a blind hole that does not penetrate through the first connection part, and the screw sleeve is embedded in the mounting hole in the form of interference fit.

8. The connection terminal according to claim 1, wherein a threaded hole is formed on at least one of the plurality of side surfaces and the bottom surface of the first connection part.

9. The connection terminal according to claim 8, wherein the threaded hole is a through hole penetrating through the first connection part or a blind hole not penetrating through the first connection part.

10. The connection terminal according to claim 1, wherein the plurality of side surfaces comprise of:

a first side surface;

a second side surface parallel and opposite to the first side surface;

a third side surface perpendicular to the first side surface and the second side surface; and a fourth side surface parallel and opposite to the third side surface.

11. The connection terminal according to claim 10, wherein when the bus bar is connected to the first side surface, an installation orientation of the connector is 0 degrees;

wherein when the bus bar is connected to the second side surface, an installation orientation of the connector is 180 degrees;

wherein when the bus bar is connected to the third side surface, an installation orientation of the connector is 90 degrees;

wherein when the bus bar is connected to the fourth side surface, an installation orientation of the connector is 270 degrees.

12. The connection terminal according to claim 10, wherein the housing has an insertion port for mating with a mating connector, and an axis of the insertion port is perpendicular to the first side surface and the second side surface and parallel to the third side surface and the fourth side surface.

13. The connection terminal according to claim 12, wherein the bottom surface of the first connection part is perpendicular to the plurality of side surfaces and parallel to the axis of the insertion port of the housing; and wherein when the bus bar is connected to the bottom surface, the installation orientation of the connector is capable of being selected from any one of 0 degrees, 90 degrees, 180 degrees and 270 degrees.

14. The connection terminal according to claim 12, wherein an axis of the second connection part coincides with the axis of the insertion port of the housing.

15. The connection terminal according to claim 14, wherein one of the first connection part and the second connection part is integrally formed with the terminal body, and the other is separate from the terminal body; or wherein the first connection part, the second connection part and the terminal body are integrally formed.

16. A connector, comprising:

a housing having an insertion port for mating with a mating connector; and a connection terminal, comprising:

a terminal body, at least part of which is installed in a housing of a connector;

a first connection part arranged at one end of the terminal body and extending outside the housing to electrically connect with a bus bar;

a second connection part connected to the other end of the terminal body and adapted to mate with a terminal of a mating connector;

the first connection part has a plurality of side surfaces and a bottom surface, and any one of the adjacent two side surfaces or bottom surface is selectively formed to match and connect with a surface of a connection end of the bus bar;

the width and/or length of any one of the plurality of side surfaces and the bottom surface is not less than the width of the connection end of the bus bar;

an axis of the insertion port is perpendicular to the first side surface and the second side surface of the plurality of side surfaces and parallel to the third side surface and the fourth side surface of the plurality of side surfaces and parallel to the bottom surface;

wherein the bus bar is adapted to be connected to any one of the two adjacent faces of the plurality of sides surfaces and/or the bottom surface.

17. The connector according to claim 16, wherein the housing comprises a mounting flange, which has an installation centerline and has a plurality of installation orientations relative to the installation centerline; and wherein the first connection part has a central axis which coincides with the installation centerline.

18. The connector according to claim 16, wherein when the bus bar is connected to a first side surface of the plurality of surfaces of the first connector part at an installation orientation of the connector is 0 degrees;

wherein when the bus bar is connected to a second side surface of the plurality of surfaces of the first connector part at an installation orientation of the connector is 180 degrees;

wherein when the bus bar is connected to a third side surface of the plurality of surfaces of the first connector part at an installation orientation of the connector is 90 degrees; or wherein when the bus bar is connected to a fourth side surface of the plurality of surfaces of the first connector part at an installation orientation of the connector is 270 degrees.

* * * * *